(No Model.)
J. S. BADIA.
SHEARS FOR CUTTING FLOWERS, PLANTS, &c.
No. 253,252. Patented Feb. 7, 1882.
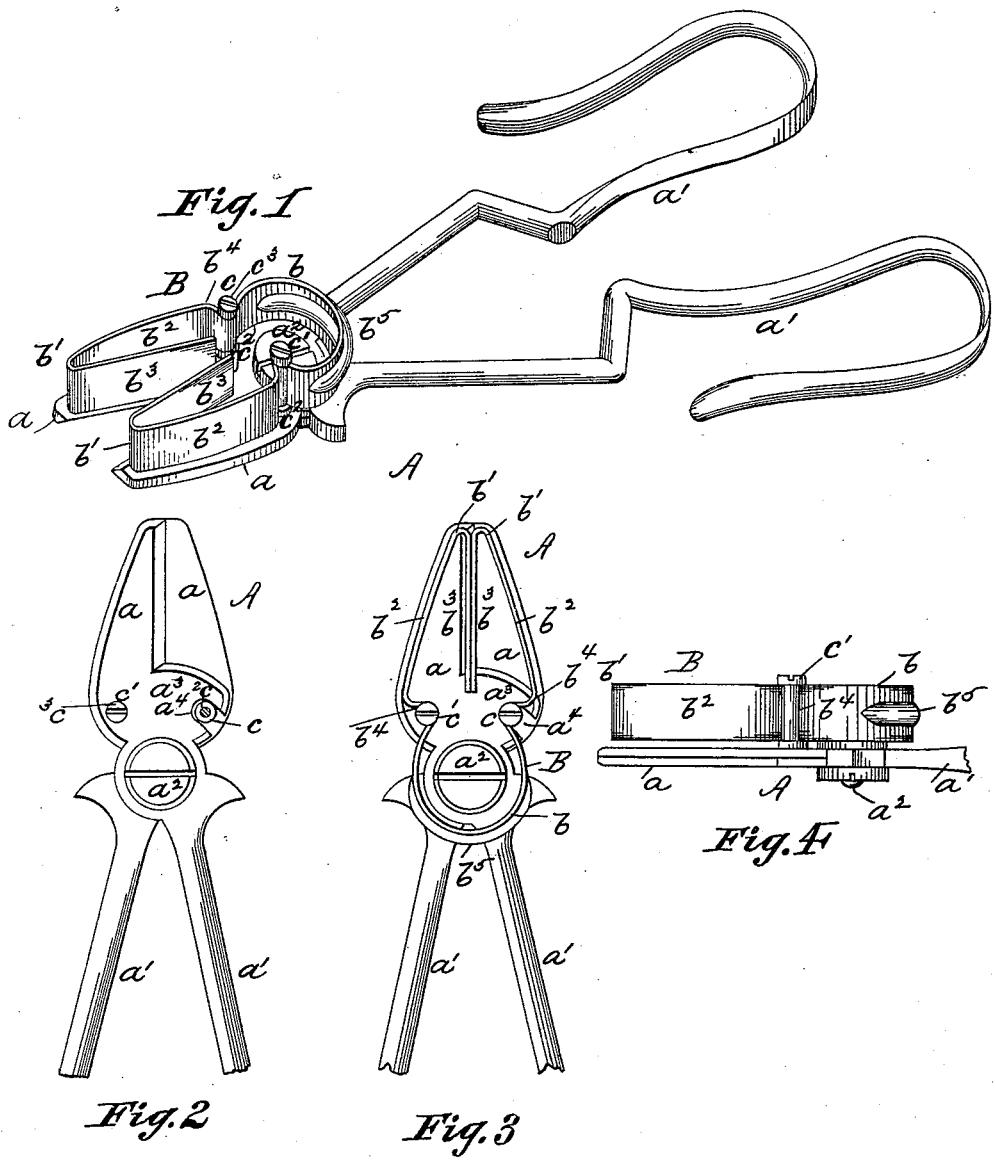
WITNESSES:
S. J. Van Staveren
H. L. Ramey.
INVENTOR,
Joseph S. Badia
By Connolly Bros,
ATTORNEYS.

UNITED STATES PATENT OFFICE.

JOSEPH S. BADIA, OF PHILADELPHIA, PENNSYLVANIA.

SHEARS FOR CUTTING FLOWERS, PLANTS, &c.

SPECIFICATION forming part of Letters Patent No. 253,252, dated February 7, 1882.

Application filed September 27, 1881. (No model.)

*To all whom it may concern:*

Be it known that I, JOSEPH S. BADIA, a citizen of the United States, residing at Philadelphia, in the county of Philadelphia and State of Pennsylvania, have invented certain new and useful Improvements in Scissors or Shears for Cutting Flowers, Plants, &c.; and I do hereby declare the following to be a full, clear, and exact description of the invention, reference being had to the accompanying drawings, which form part of this specification, in which—

Figure 1 is a perspective of my invention; Figs. 2 and 3 are plans of the same, and Fig. 4 is an elevation.

My invention is an improvement in scissors and shears for cutting flowers, branches, stems of plants and fruits—such as bunches of grapes, &c.—the cutting of which with common scissors or shears requires the holding of the stem to be cut with one hand, while the severance is made by the other. This being an operation compelling the use of both hands, and the stems to be cut being often wet or thorny, the task is frequently disagreeable and painful.

The object of my invention is to provide an improvement in scissors and shears whereby the tool will both cut and hold the flower at the same time.

My invention consists in the peculiar construction and combination of parts hereinafter fully described, having reference particularly to a spring so constructed and applied to a pair of scissors or shears that it will hold the stem of the flower or fruit while and after being cut.

Referring to the accompanying drawings, A designates a pair of scissors or shears composed of two blades, $a\ a$, with handles $a'\ a'$, held together by a pivot-screw, $a^2$.

B represents a spring formed with a bow, $b$, from which project jaws $b'\ b'$, said jaws being composed each of two flaring sides, $b^2\ b^3$, the sides $b^3$ being the inturned ends or continuations of the sides $b^2$. At the points where the bow $b$ proceeds to the jaws $b'\ b'$ the spring is bent to form recesses $b^4\ b^4$ for the reception of pins or screws $c\ c'$, which are fastened in the blades $a\ a$, and formed with collars $c^2\ c^3$, the lower collar, $c^2$, of the screw $c$ being of greater depth than the corresponding collar of the screw $c'$, as shown. The spring B is applied to the scissors by first compressing it, then passing it down between the pins or screws $c\ c'$ while the scissors-jaws are open, and then permitting it to expand, so as to cause the pins $c\ c'$ to enter or be received in the recesses $b^4\ b^4$. The bow $b$ is formed with one or two corrugations, $b^5$, so as to stiffen it, said corrugation not extending the full length of the bow, hence allowing spring action in the latter between the extremities of the former and the recesses $b^4\ b^4$. To increase the bearing of the scissors-blades on each other, so as to improve their efficiency, and to prevent the cutting-edges from overlapping each other, said blades are formed with projections $a^3\ a^3$. The projection $a^3$ of the upper jaw is notched, as shown at $a^4$, to pass the pin $c$ when said jaws are closed.

The operation is as follows: The spring B holds the blades of the scissors normally open by reason of the pressure it exerts against the pins or screws $c\ c'$. While open said blades are passed on either side of the stem or branch to be cut, or said stem or branch is passed between said blades and between the spring-jaws $b'\ b'$. The handles $a'\ a'$ are now pressed toward each other, closing the jaws on said stem and causing the blades to cut the latter. The handles being still kept closed, the cut stem or branch is clamped between the jaws, and will be so held until the handles, or one of them, is released, when the jaws and scissors-blades will be opened by the action of the spring.

The sides $b^3$ of the jaws are parallel with the edges of the scissors-blades, and when opened are a little farther apart than said edges. In closing, however, the spring-jaws advance toward each other faster than do the cutting-edges of the blades. Hence the stem or branch to be cut is seized before and held while being cut, as well as after said cut is effected.

What I claim as my invention is as follows:

1. In shears for cutting plants, the combination, with the blades $a\ a$, of the spring B, formed with a bow, $b$, and jaws $b'\ b'$, composed of flaring sides $b^2\ b^3$, constructed and arranged substantially as and for the purpose described.

2. In shears for cutting plants, the spring B, having bow $b$, jaws $b'\ b'$, and recesses $b^4\ b^4$ for the reception of holding pins or screws $c\ c'$, substantially as shown and described.

3. In shears for cutting plants, the spring B, having bow $b$, with corrugation $b^5$, jaws $b'$ $b'$, composed of flaring sides $b^2$ $b^3$, and recesses $b^4$ $b^4$, substantially as shown and described.

4. In combination with the spring B, the scissors or shears A, having blades $a$ $a$, with projections $a^3$, and pins $c$ $c'$, substantially as shown and described.

5. In combination with scissors or shears A, the spring B, composed of a bow, $b$, and spring-jaws $b'$ $b'$, substantially as shown and described.

6. The combination, with scissors or shears A, of holding pins or screws $c$ $c'$ and spring B, formed with corrugated bow $b$, flaring spring-jaws $b'$ $b'$, and recesses $b^4$ $b^4$ for the reception of said pins or screws, substantially as shown and described.

In testimony that I claim the foregoing I have hereunto set my hand this 20th day of September, 1881.

JOSEPH S. BADIA.

Witnesses:
WM. M. McKNIGHT,
S. J. VAN STAVOREN.